US 10,806,227 B1

United States Patent
Medeiros

(10) Patent No.: US 10,806,227 B1
(45) Date of Patent: Oct. 20, 2020

(54) CELL PHONE CASE

(71) Applicant: Randy Medeiros, New Bedford, MA (US)

(72) Inventor: Randy Medeiros, New Bedford, MA (US)

(*) Notice: Subject to any disclaimer, the term of this patent is extended or adjusted under 35 U.S.C. 154(b) by 0 days.

(21) Appl. No.: 16/741,887

(22) Filed: Jan. 14, 2020

(51) Int. Cl.
*H04B 1/3888* (2015.01)
*H04M 1/02* (2006.01)
*H04M 1/21* (2006.01)
*G06F 3/033* (2013.01)
*A45C 11/34* (2006.01)
*H02J 7/00* (2006.01)
*G06F 3/0354* (2013.01)
*A45C 11/00* (2006.01)

(52) U.S. Cl.
CPC .......... *A45C 11/34* (2013.01); *G06F 3/03545* (2013.01); *H02J 7/0044* (2013.01); *A45C 2011/002* (2013.01)

(58) Field of Classification Search
CPC ........ H04M 1/04; H04M 1/02; H04M 1/0202; H04M 1/21; H04M 1/0254; H04M 1/0258; G06F 1/616; G06F 3/0354; G06F 3/16; G06F 3/014; G06F 3/033; H04B 1/3888; H04B 1/38
See application file for complete search history.

(56) References Cited

U.S. PATENT DOCUMENTS

| D754,133 S | 4/2016 | Chen | |
|---|---|---|---|
| 9,755,688 B1 | 9/2017 | McKenzie | |
| 2012/0172090 A1 | 7/2012 | Capps | |
| 2012/0308064 A1 | 12/2012 | Matthews | |
| 2014/0015812 A1* | 1/2014 | Peralta | G06F 3/03545 345/179 |
| 2016/0182699 A1* | 6/2016 | Hou | G06F 3/03545 455/556.1 |
| 2017/0346523 A1* | 11/2017 | Nyholm | H04M 1/0202 |
| 2018/0152550 A1 | 5/2018 | Dharmatilleke | |
| 2020/0019257 A1* | 1/2020 | Chang | G06F 3/0383 |
| 2020/0174522 A1* | 6/2020 | Lim | G09F 9/301 |
| 2020/0218364 A1* | 7/2020 | Kim | G06F 3/0346 |

FOREIGN PATENT DOCUMENTS

WO 2012112790 8/2012

* cited by examiner

Primary Examiner — Blane J Jackson

(57) ABSTRACT

The improved cell phone case comprises a phone case and a stylus. The phone case may cover and protect a smart device. The stylus may be operable to mark on a touch screen of the smart device. The phone case may comprise a stylus holder for carrying the stylus. The stylus may be communicatively coupled to the smart device via a wireless link. The stylus may comprise a microphone and a speaker and may be operable as a remote handset for the smart device both when the stylus is coupled to the phone case via the stylus holder and when the stylus is removed from the stylus holder. The stylus may be held next to a head of a user so that the user may hear call audio from the speaker and the smart device may pick up user's speech via the microphone.

15 Claims, 5 Drawing Sheets

CELL PHONE CASE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal communication devices, more specifically, an improved cell phone case.

SUMMARY OF INVENTION

The improved cell phone case comprises a phone case and a stylus. The phone case may cover and protect a smart device. The stylus may be operable to mark on a touch screen of the smart device. The phone case may comprise a stylus holder for carrying the stylus. The stylus may be communicatively coupled to the smart device via a wireless link. The stylus may comprise a microphone and a speaker and may be operable as a remote handset for the smart device both when the stylus is coupled to the phone case via the stylus holder and when the stylus is removed from the stylus holder. The stylus may be held next to a head of a user so that the user may hear call audio from the speaker and the smart device may pick up user's speech via the microphone.

An object of the invention is to cover and protect a smart device.

Another object of the invention is to provide a stylus for marking on a touch screen of the smart device.

A further object of the invention is to provide a sound transducer and microphone in the stylus that are wirelessly coupled to the smart device for use as a handset.

Yet another object of the invention is to provide a user control on the stylus for activating and deactivating features of the invention.

These together with additional objects, features and advantages of the improved cell phone case will be readily apparent to those of ordinary skill in the art upon reading the following detailed description of the presently preferred, but nonetheless illustrative, embodiments when taken in conjunction with the accompanying drawings.

In this respect, before explaining the current embodiments of the improved cell phone case in detail, it is to be understood that the improved cell phone case is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the improved cell phone case.

It is therefore important that the claims be regarded as including such equivalent construction insofar as they do not depart from the spirit and scope of the improved cell phone case. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
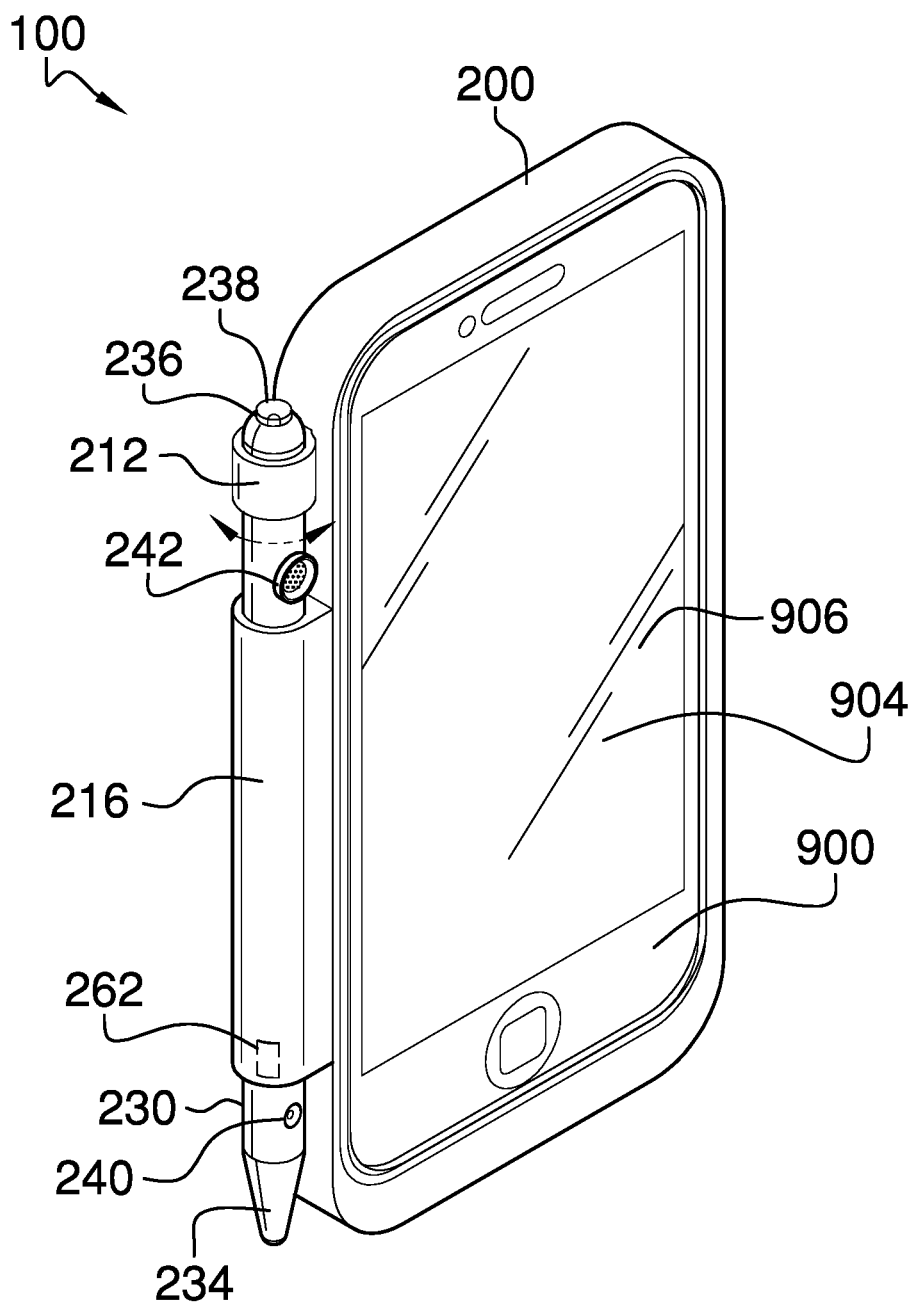
FIG. 1 is an isometric view of an embodiment of the disclosure illustrating the stylus in place in the stylus holder.
Figure 2:
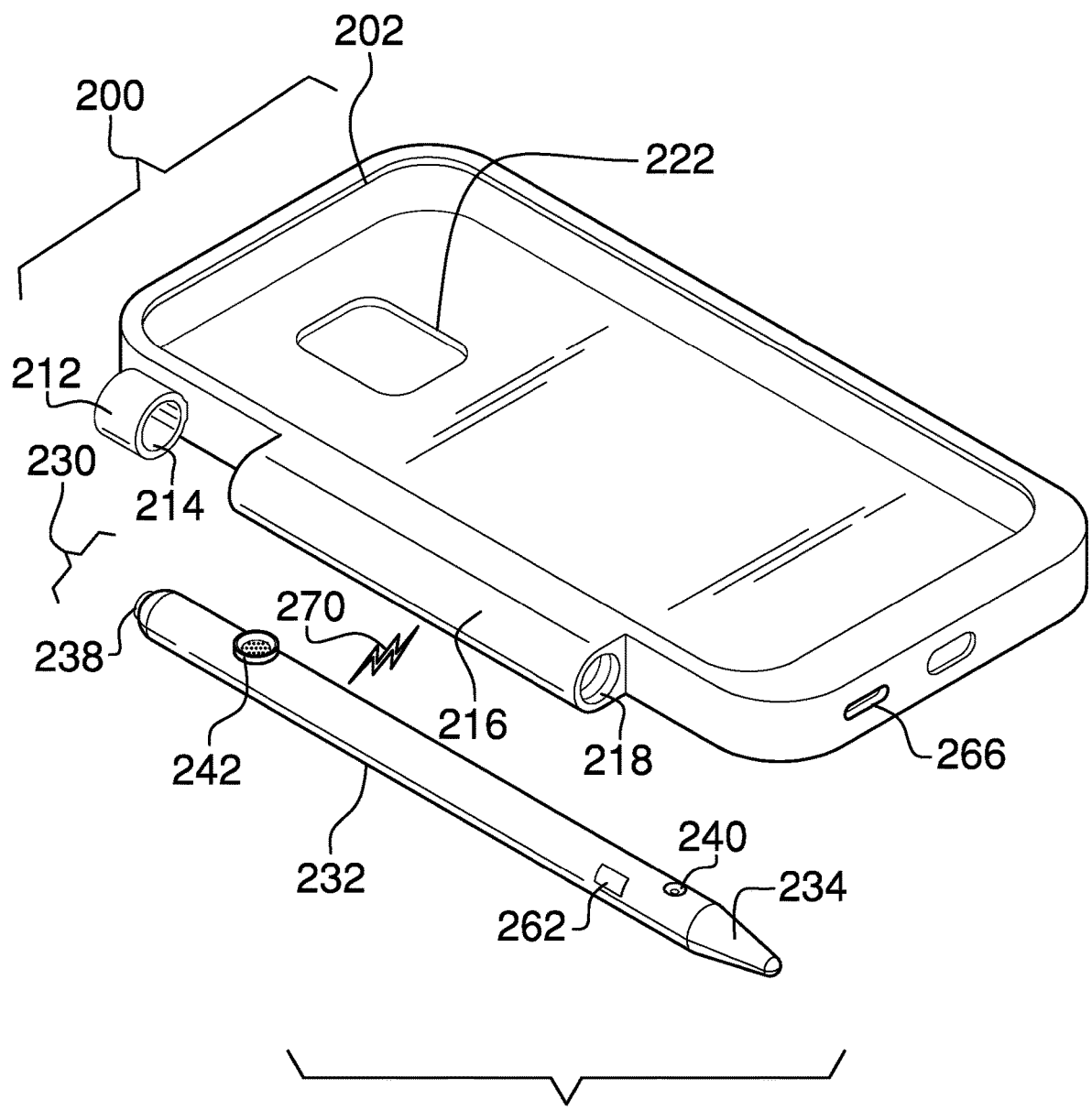
FIG. 2 is an isometric view of an embodiment of the disclosure illustrating the stylus remove from the stylus holder.
Figure 3:
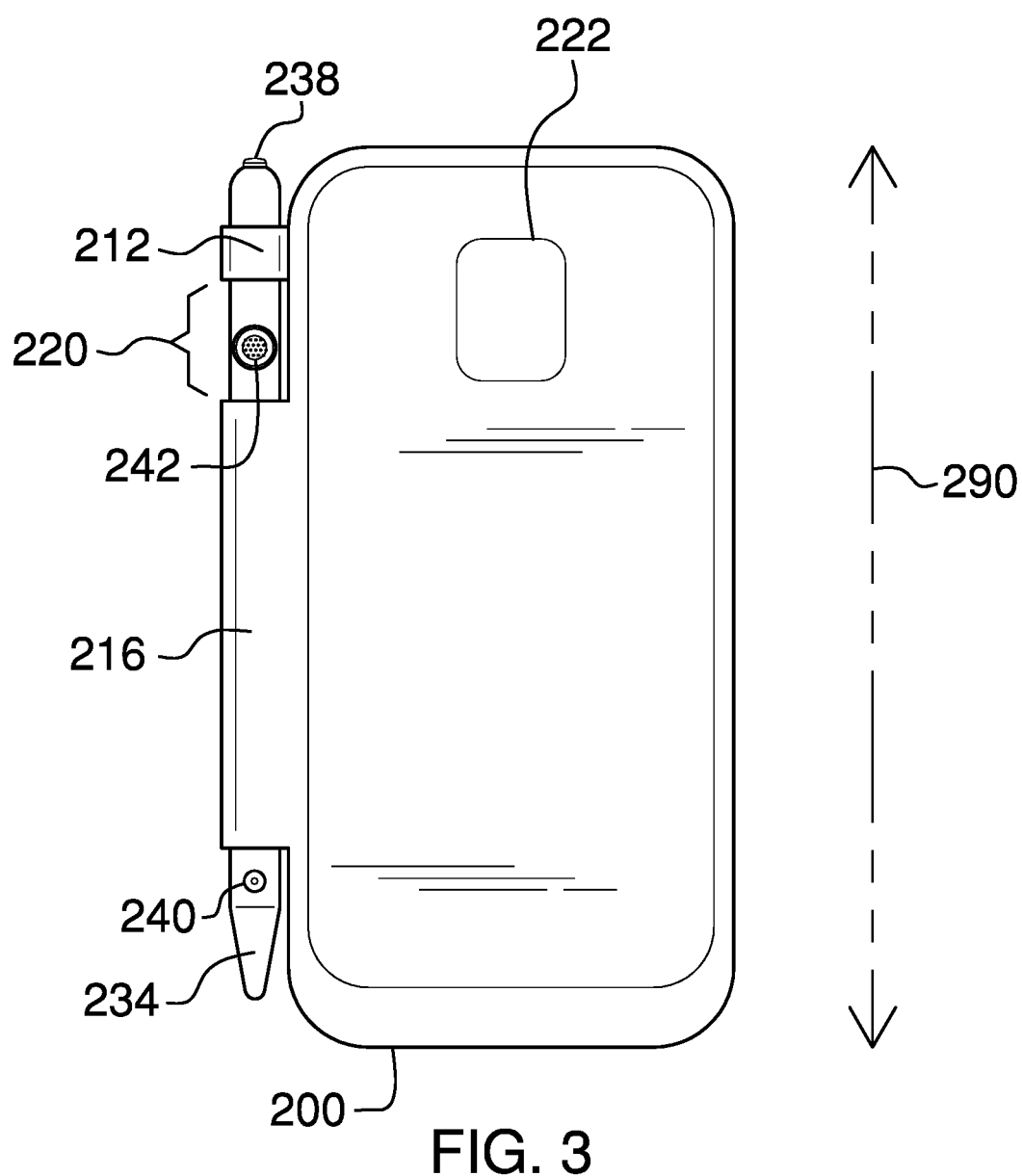
FIG. 3 is a front view of an embodiment of the disclosure.
Figure 4:
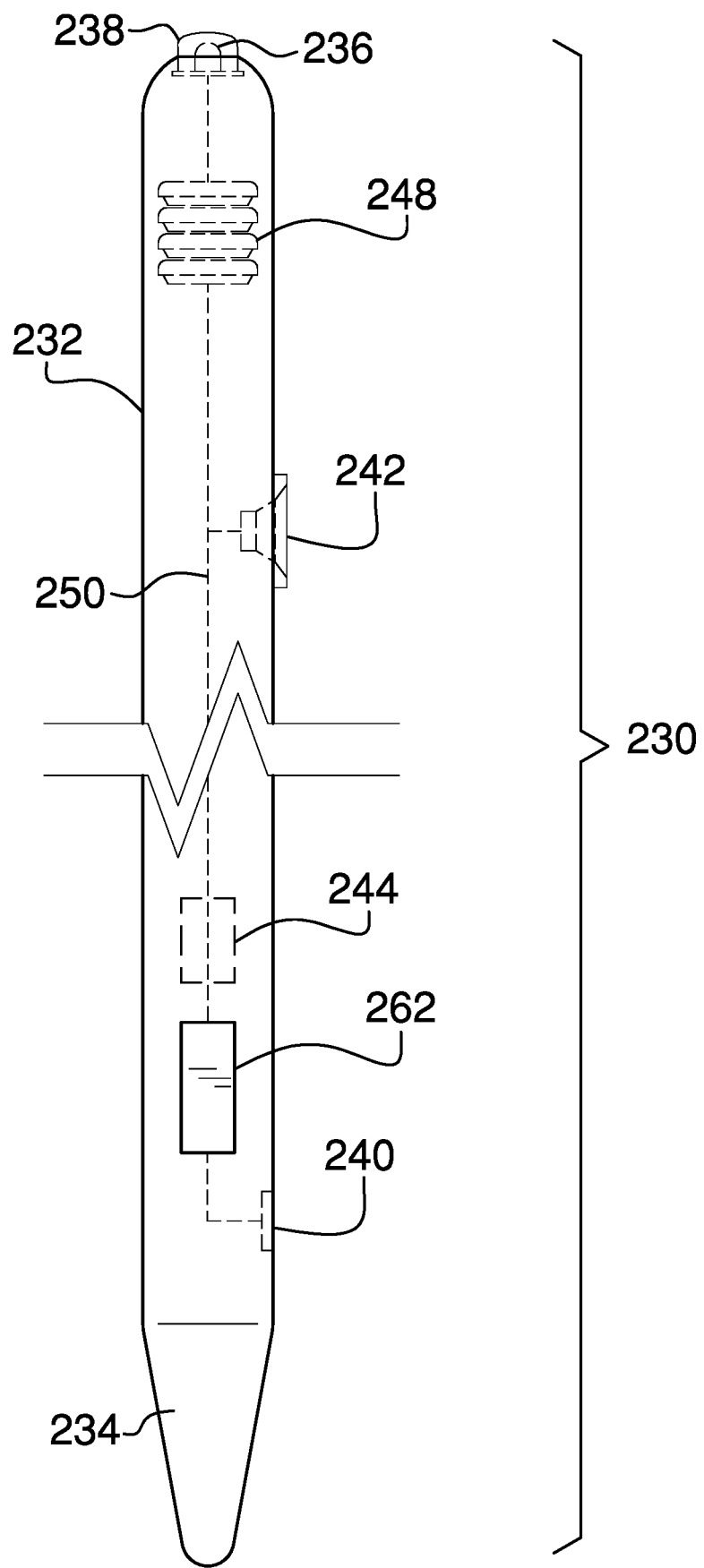
FIG. 4 is a side view of an embodiment of the disclosure illustrating the stylus.
Figure 5:
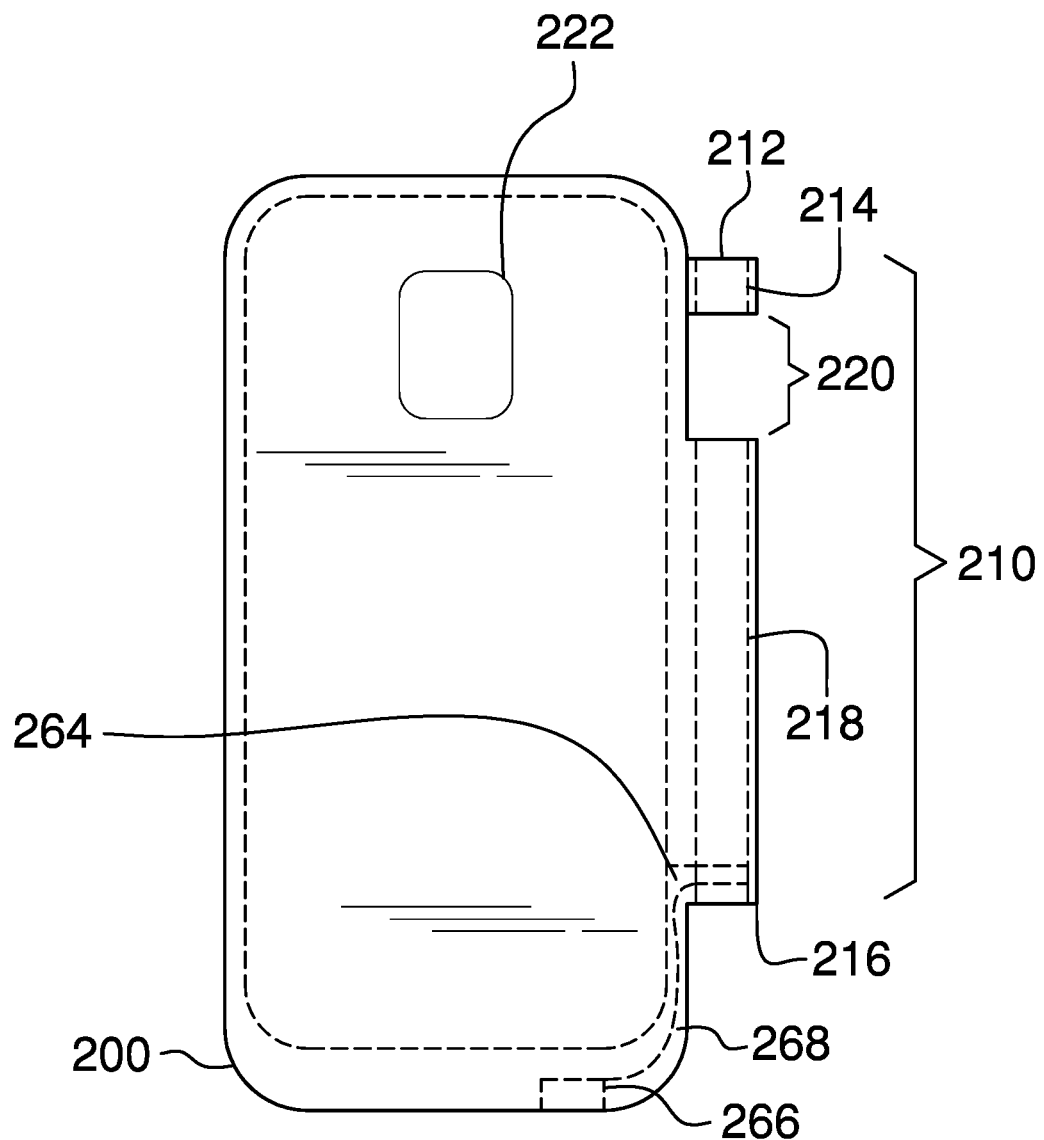
FIG. 5 is a back view of an embodiment of the disclosure illustrating the phone case.

Detailed reference will now be made to a first potential embodiment of the disclosure, which is illustrated in FIGS. 1 through 5.

The improved cell phone case 100 (hereinafter invention) comprises a phone case 200 and a stylus 230. The phone case 200 may cover and protect a smart device 900. As a non-limiting example, the smart device 900 may be a cell phone. The stylus 230 may be operable to mark on a touch screen 906 of the smart device 900. The phone case 200 may comprise a stylus holder 210 for carrying the stylus 230 when the stylus 230 is not in use. The stylus 230 may be communicatively coupled to the smart device 900 via a wireless link 270. The stylus 230 may be operable as a remote handset for the smart device 900 both when the stylus 230 is coupled to the phone case 200 via the stylus holder 210 and when the stylus 230 is removed from the stylus holder 210. Specifically, the stylus 230 may comprise a microphone 240 and a speaker 242. The stylus 230 may be held next to a head of a user so that the user may hear call audio from the speaker 242 and the smart device 900 may pick up user's speech via the microphone 240.

The phone case 200 may be a semi-rigid covering for the smart device 900. The phone case 200 may be removably coupled to the smart device 900 by inserting the smart device 900 into the phone case 200. The phone case 200 may protect the smart device 900 by providing a shock-absorbing cushion around the smart device 900. The phone case 200 may be adapted to enhance the grip of the smart device 900 by increasing friction between the smart device 900 and a user's hand. The phone case 200 may comprise a screen aperture 202 and the stylus holder 210. The screen aperture 202 may be an opening in a surface of the phone case 200 that provides access to a display 904 of the smart device 900.

The stylus holder 210 may be a coupler that is exposed on an external surface of the phone case 200. The stylus holder 210 may removably couple the stylus 230 to the phone case 200. The stylus holder 210 may comprise a top sleeve 212, a bottom sleeve 216, and a sleeve gap 220. The top sleeve 212 may be a projection from an external surface of the phone case 200. The top sleeve 212 may comprise a top sleeve aperture 214. The top sleeve aperture 214 may be a cylindrical opening that passes through the top sleeve 212. The top sleeve aperture 214 may be oriented to pass in a longitudinal direction 290 of the phone case 200. The bottom sleeve 216 may be a projection from an external surface of the phone case 200. The bottom sleeve 216 may comprise a bottom sleeve aperture 218. The bottom sleeve aperture 218 may be a cylindrical opening that passes through the bottom sleeve 216. The bottom sleeve aperture 218 may be oriented to pass in the longitudinal direction 290 of the phone case 200. In some embodiments, the top sleeve 212 and the bottom sleeve 216 may be made from different materials. As non-limiting examples, the top sleeve 212 and the bottom sleeve 216 may differ in terms of stiffness, friction, color, or combinations thereof.

The top sleeve 212 and the bottom sleeve 216 may be axially aligned with each other such that the stylus 230 may be placed into the stylus holder 210 by sliding a tip 234 of the stylus 230 through the top sleeve 212 and then through the bottom sleeve 216. The top sleeve 212 and the bottom sleeve 216 may be separated from each other by the sleeve gap 220. The sleeve gap 220 may provide access to the speaker 242 when the stylus 230 is inserted into the stylus holder 210.

The stylus 230 may comprise a body 232, the tip 234, a light source 236, a user control 238, the microphone 240, the speaker 242, a wireless transceiver 244, and one or more batteries 248. The stylus 230 may be operable to mark on the touch screen 906 of the smart device 900 by holding the body 232 of the stylus 230 and pressing the tip 234 of the stylus 230 against the touch screen 906.

The body 232 may be a cylindrical enclosure for the speaker 242, the microphone 240, the wireless transceiver 244, the user control 238, the light source 236, and the one or more batteries 248. The outside diameter of the body 232 may match the inside diameter of the top sleeve 212 and the inside diameter of the bottom sleeve 216 such that the stylus 230 may be held in place by a friction fit between the stylus holder 210 and the body 232. The body 232 may be bounded at the bottom by the tip 234 and at the top by the light source 236 and the user control 238.

The light source 236 may be a visual indicator showing an internal state of the smart device 900 and/or the stylus 230. As a non-limiting example, the light source 236 may illuminate to indicate that a call is in process or that the one or more batteries 248 are recharging.

The user control 238 may be a control that is operable to activate or deactivate a feature of the smart device 900 and/or the stylus 230. As a non-limiting example, triggering the user control 238 may cause a call to be connected or disconnected. In some embodiments, the light source 236 may be operable as a flashlight and the user control 238 may activate and deactivate the light source 236

The microphone 240 may be a transducer that converts sound waves into an electrical input signal. The electrical input signal may be passed to the wireless transceiver 244. The speaker 242 may convert an electrical output signal into an audible sound. The electrical output signal may be provided to the speaker 242 by the wireless transceiver 244.

The wireless transceiver 244 may wirelessly communicate the electrical input signal and the electrical output signal between the stylus 230 and the smart device 900. As non-limiting examples, the wireless transceiver 244 may communicate with the smart device 900 using Bluetooth protocols.

The one or more batteries 248 may comprise one or more energy-storage devices. The one or more batteries 248 may be a source of electrical energy to operate the speaker 242, the microphone 240, the wireless transceiver 244, and the light source 236. The one or more batteries 248 may be replaceable or rechargeable. The speaker 242, the microphone 240, the wireless transceiver 244, the user control 238, the light source 236, and the one or more batteries 248 may be interconnected by stylus wiring 250.

In some embodiments, the phone case 200 may comprise one or more accessory apertures 222. The one or more accessory apertures 222 may be located on any surface of the phone case 200. The one or more accessory apertures 222 may provide access to features of the smart device 900. As non-limiting example, the one or more accessory apertures 222 may provide access to cameras, lighting, earphone jacks, power connectors, volume controls, power controls, and combinations thereof.

In some embodiments, the invention 100 may comprise a stylus charging interconnection. The stylus charging interconnection may be operable to recharge the one or more batteries 248 while the stylus 230 is stored in the stylus holder 210. The stylus charging interconnection may comprise a stylus charging coupler 262, a case to stylus coupler 264, a case to phone coupler 266, and case wiring 268. The stylus charging coupler 262 may be an electrical coupler located on the stylus 230. As a non-limiting example, the stylus charging coupler 262 may be one or more electrical contacts that are exposed on the side of the body 232 of the stylus 230. The stylus charging coupler 262 may be connected to the stylus wiring 250 such that an electrical potential applied to the stylus charging coupler 262 may recharge the one or more batteries 248. The case to stylus coupler 264 may be an electrical coupler located with the bottom sleeve 216 of the phone case 200. As a non-limiting example, the case to stylus coupler 264 may be one or more electrical contacts that are exposed on the inside wall of the bottom sleeve 216. The case to stylus coupler 264 may electrically couple to the stylus charging coupler 262 when the stylus 230 is inserted into the stylus holder 210. The case to phone coupler 266 may be an electrical coupler located with the bottom of the phone case 200 at a position corresponding to a power connector of the smart device 900. The case to phone coupler 266 may electrically couple to the power connector of the smart device 900 such that the smart device 900 may provide an electrical potential to recharge the stylus 230. The case to phone coupler 266 may be electrically coupled to the case to stylus coupler 264 via the case wiring 268.

In some embodiments, the case to phone coupler 266 may be a pass-through connector such that a phone recharging cord plugged into the case to phone coupler 266 may be electrically connected to the power connector of the smart device 900. The case to phone coupler 266 may simultaneously connect the case to stylus coupler 264 via the case wiring 268.

In use, the smart device 900 may be inserted into the phone case 200. In some embodiments, the smart device 900 may be inserted by passing the smart device 900 through the screen aperture 202 while gently pulling on the edges of the screen aperture 202. The stylus 230 may be placed into the stylus holder 210 by sliding the tip 234 of the stylus 230 through the top sleeve 212 and then through the bottom sleeve 216. When properly stored, the stylus charging coupler 262 on the body 232 of the stylus 230 may be in electrical contact with the case to stylus coupler 264 on the inside sidewall of the bottom sleeve 216 of the phone case 200. With the stylus 230 in the stylus holder 210, the speaker 242 may be accessible in the sleeve gap 220 and the microphone 240 may be accessible below the bottom sleeve 216. The stylus 230 may pair wirelessly with the smart device 900 such that call audio may be routed to the stylus 230. The stylus 230 may be used as the remote handset while inserted in the stylus holder 210 or the stylus 230 may be removed from the stylus holder 210 and used as the remote handset. In some embodiments, the user control 238 may be triggered to connect and disconnect calls. In some embodiments, the user control 238 may be triggered to activate and deactivate the light source 236 for use as a flashlight.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "accessory" is a second object that adds to the convenience or attractiveness of a first object. In some instances, an accessory may extend the functionality of the first object by allowing the combination of the accessory plus the first object to perform a task that the first object could not perform alone.

As used in this disclosure, an "aperture" is an opening in a surface. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, "Bluetooth" is a standardized communication protocol that is used to wirelessly interconnect electronic devices. Bluetooth® is a registered trademark of Bluetooth SIG.

As used in this disclosure, a "boundary" refers to a line segment or surface that forms a some or all of the perimeter of a first space and some or all of the perimeter of a second space. Stated less formally, the boundary forms at least part of the delineation between the first space and the second space. When identifying a boundary within this disclosure, a first space may be said to "be bounded" by one or more additional spaces.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used in this disclosure, the word "correspond" indicates that a first object is in some manner linked to a second object in a one to one relationship or that one or more properties shared by two or more objects match, agree, or align within acceptable manufacturing tolerances.

As used herein, the words "couple", "couples", "coupled" or "coupling", refer to connecting, either directly or indirectly, and does not necessarily imply a mechanical connection.

As used in this disclosure, a "display" is a surface upon which is presented an image, potentially including, but not limited to, graphic images and text, that is interpretable by an individual viewing the image. When used as a verb, "display" is defined as presenting such an image.

As used herein, the term "friction fit" refers to a type of mechanical coupling where a first component presses into a second component and is held there only by the friction of the first component against the second component. A friction fit may also be known as an interference fit or a press fit.

As used herein, "inside diameter" or "inner diameter" refers to a measurement made on a hollow object. Specifically, the inside diameter is the distance from one inside wall to the opposite inside wall. If the object is round, then the inside diameter is a true diameter, however the term may also be used in connection with a square object in which case the inside diameter is simply the narrowest inside measurement that passes through the center of the object.

As used herein, the word "longitudinal" or "longitudinally" refers to a lengthwise or longest direction.

As used in this disclosure, a "microphone" is a transducer that converts the energy from vibration into electrical energy. The sources of vibrations include, but are not limited to, acoustic energy.

As used herein, "outside diameter" or "outer diameter" refers to a measurement made on an object. Specifically, the outside diameter is the distance from one point on the outside of the object to a point on the opposite side of the object along a line passing through the center of the object. The term outside diameter is frequently used in conjunction with round objects such as hollow conduits in which case the outside diameter is a true diameter, however the term may also be used in connection with a square object in which case the outside diameter is simply the widest outside measurement that passes through the center of the conduit.

As used herein, "pair", "paired", and "pairing" refer to a connection established between two wireless devices or to the process of establishing such a connection.

As used in this disclosure, "resilient" or "semi-rigid" refer to an object or material which will deform when a force is applied to it and which will return to its original shape when the deforming force is removed.

As used herein, "smart device" refers to a portable electrical device comprising at least a processor, display, input device, and network connection. The input device is generally a touch screen, keyboard, or voice recognition. The network connection is generally wireless. Non-limiting examples of smart devices may include smartphones, tablets, personal digital assistants, laptop computers, and smartwatches.

As used in this disclosure, a "speaker" is an electrical transducer that converts an electrical signal into an audible sound; also known as a loudspeaker.

As used in this disclosure, the terms "stiff", "stiffer", and "stiffness" are comparative terms that may be used to compare the relative rigidity of two objects. Specifically, if a given force is applied to a first object and a second object, the object that deforms less is said to be stiffer than the object that displayed greater deformation. Alternatively, it may be said that the object that deforms less possesses more stiffness.

As used in this disclosure, a "touchscreen" is an interface that allows a user to interface with a logical device by touching the image bearing surface of a display.

As used in this disclosure, a "transceiver" is a device that is used to transmit and/or receive signals. The signals may be audible, optical, or RF in nature.

As used in this disclosure, a "transducer" is a device that converts a physical quantity, such as pressure or brightness into an electrical signal or a device that converts an electrical signal into a physical quantity.

Throughout this document references to "wire", "wires", "wired", or "wiring" may describe and/or show a single conductor when, in fact, two conductors may be required to power or control a subsystem; a convention used herein is that the common return conductor to which all electrical subsystems are connected may not be shown in order to clarify the figures. This common return conductor is a continuous electrical path and does not pass through any type of switch or other electrical component other than the possibility of passing through one or more connectors.

As used in this disclosure, "wireless" is an adjective that is used to describe a communication channel that does not require the use of physical cabling.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. An improved cell phone case comprising:
a phone case and a stylus;
wherein the phone case covers and protects a smart device;
wherein the stylus is operable to mark on a touch screen of the smart device;
wherein the phone case comprises a stylus holder for carrying the stylus when the stylus is not in use;
wherein the stylus is communicatively coupled to the smart device via a wireless link;
wherein the stylus is operable as a remote handset for the smart device both when the stylus is coupled to the phone case via the stylus holder and when the stylus is removed from the stylus holder;
wherein the phone case is a semi-rigid covering for the smart device;
wherein the phone case is removably coupled to the smart device by inserting the smart device into the phone case;
wherein the phone case protects the smart device by providing a shock-absorbing cushion around the smart device;
wherein the phone case is adapted to enhance the grip of the smart device by increasing friction between the smart device and a user's hand;
the phone case comprises a screen aperture and the stylus holder;
wherein the screen aperture is an opening in a surface of the phone case that provides access to a display of the smart device;
wherein the stylus holder is a coupler that is exposed on an external surface of the phone case;
wherein the stylus holder removably couples the stylus to the phone case;
wherein the stylus holder comprises a top sleeve, a bottom sleeve, and a sleeve gap;
wherein the top sleeve is a projection from an external surface of the phone case;
wherein the top sleeve comprises a top sleeve aperture;
wherein the top sleeve aperture is a cylindrical opening that passes through the top sleeve;
wherein the top sleeve aperture is oriented to pass in a longitudinal direction of the phone case;
wherein the bottom sleeve is a projection from an external surface of the phone case;
wherein the bottom sleeve comprises a bottom sleeve aperture;
wherein the bottom sleeve aperture is a cylindrical opening that passes through the bottom sleeve;
wherein the bottom sleeve aperture is oriented to pass in the longitudinal direction of the phone case;
wherein the top sleeve and the bottom sleeve are axially aligned with each other such that the stylus is placed into the stylus holder by sliding a tip of the stylus through the top sleeve and then through the bottom sleeve;
wherein the top sleeve and the bottom sleeve are separated from each other by the sleeve gap;
wherein the sleeve gap provides access to a speaker when the stylus is inserted into the stylus holder.

2. The improved cell phone case according to claim 1 wherein the top sleeve and the bottom sleeve are made from different materials.

3. The improved cell phone case according to claim 1 wherein the stylus comprises a body, the tip, a light source, a user control, a microphone, the speaker, a wireless transceiver, and one or more batteries;

wherein the stylus is operable to mark on the touch screen of the smart device by holding the body of the stylus and pressing the tip of the stylus against the touch screen.

4. The improved cell phone case according to claim 3 wherein the body is a cylindrical enclosure for the speaker, the microphone, the wireless transceiver, the user control, the light source, and the one or more batteries;
wherein the outside diameter of the body matches the inside diameter of the top sleeve and the inside diameter of the bottom sleeve such that the stylus is held in place by a friction fit between the stylus holder and the body;
wherein the body is bounded at the bottom by the tip and at the top by the light source and the user control.

5. The improved cell phone case according to claim 4 wherein the light source is a visual indicator showing an internal state of the smart device and/or the stylus.

6. The improved cell phone case according to claim 5 wherein the user control is a control that is operable to activate or deactivate a feature of the smart device and/or the stylus.

7. The improved cell phone case according to claim 6 wherein triggering the user control causes a call to be connected or disconnected.

8. The improved cell phone case according to claim 6 wherein the light source is operable as a flashlight and the user control activates and deactivates the light source.

9. The improved cell phone case according to claim 6 wherein the microphone is a transducer that converts sound waves into an electrical input signal;
wherein the electrical input signal is passed to the wireless transceiver;
wherein the speaker converts an electrical output signal into an audible sound;
wherein the electrical output signal is provided to the speaker by the wireless transceiver.

10. The improved cell phone case according to claim 9 wherein the wireless transceiver wirelessly communicates the electrical input signal and the electrical output signal between the stylus and the smart device.

11. The improved cell phone case according to claim 10 wherein the one or more batteries comprise one or more energy-storage devices;
wherein the one or more batteries are a source of electrical energy to operate the speaker, the microphone, the wireless transceiver, and the light source;
wherein the one or more batteries are replaceable or rechargeable.

12. The improved cell phone case according to claim 11 wherein the phone case comprises one or more accessory apertures.

13. The improved cell phone case according to claim 11 wherein the improved cell phone case comprises a stylus charging interconnection;
wherein the stylus charging interconnection is operable to recharge the one or more batteries while the stylus is stored in the stylus holder.

14. The improved cell phone case according to claim 13 wherein the stylus charging interconnection comprises a stylus charging coupler, a case to stylus coupler, a case to phone coupler, and case wiring;
wherein the stylus charging coupler is an electrical coupler located on the stylus;
wherein the stylus charging coupler is connected to stylus wiring such that an electrical potential applied to the stylus charging coupler recharges the one or more batteries;
wherein the case to stylus coupler is an electrical coupler located with the bottom sleeve of the phone case;
wherein the case to stylus coupler electrically couples to the stylus charging coupler when the stylus is inserted into the stylus holder;
wherein the case to phone coupler is an electrical coupler located with the bottom of the phone case at a position corresponding to a power connector of the smart device;
wherein the case to phone coupler electrically couples to the power connector of the smart device such that the smart device provides an electrical potential to recharge the stylus;
wherein the case to phone coupler is electrically coupled to the case to stylus coupler via the case wiring.

15. The improved cell phone case according to claim 14 wherein the case to phone coupler is a pass-through connector such that a phone recharging cord plugged into the case to phone coupler is electrically connected to the power connector of the smart device;
wherein the case to phone coupler simultaneously connects the case to stylus coupler via the case wiring.

* * * * *